April 23, 1935.  F. G. SUCKOW  1,998,468
DRAFT RIGGING
Filed Jan. 26, 1932
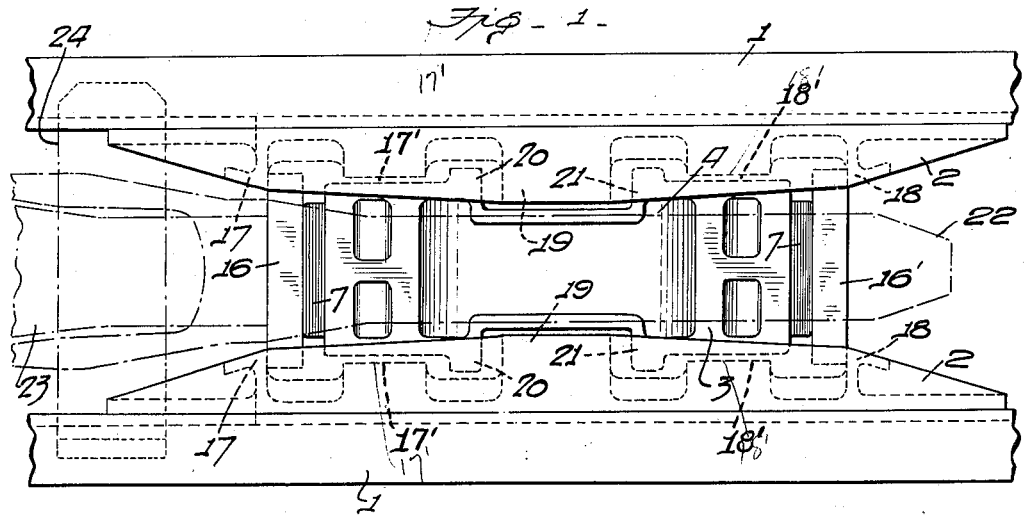
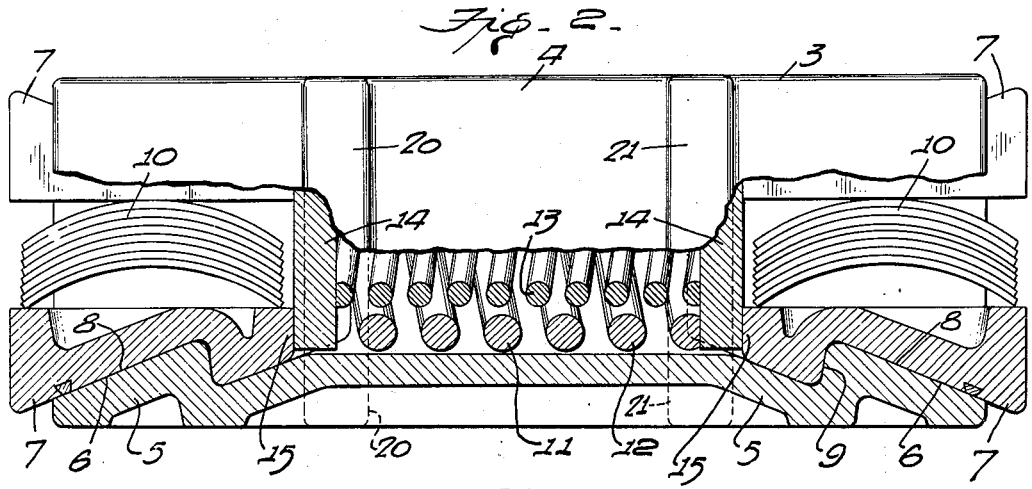
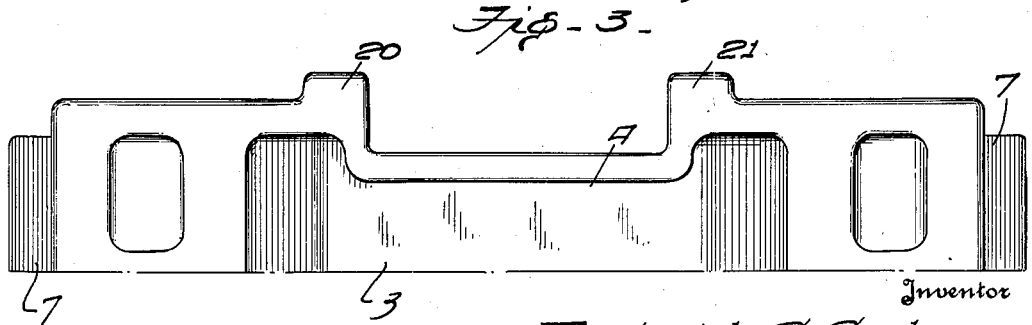
Inventor
Frederick G. Suckow
By Ernest H. Mechlin
Attorney Patented Apr. 23, 1935

1,998,468

UNITED STATES PATENT OFFICE 1,998,468

DRAFT RIGGING

Frederick G. Suckow, Bowmansville, N. Y., assignor to The Gould Coupler Company, New York, N. Y., a corporation of Maryland Application January 26, 1932, Serial No. 588,967

4 Claims. (Cl. 213—39)

This invention relates to draft rigging and, more particularly, to a friction draft gear adapted for use with existing tandem spring cheek plates.

The principal object of my invention, generally considered, is the provision of a double-end draft gear comprising a housing receiving friction elements actuated transversely by plate springs and urged longitudinally to release positions by common spring means disposed therebetween.

Another object of my invention is the provision of a draft gear or cushioning device comprising a housing open at both ends and of a size adapted for use with existing tandem spring cheek plates, said housing being provided with lugs adapted to straddle the intermediate lugs of said cheek plates and limit movement of said housing in both directions, friction elements engaging said housing at both ends and urged transversely into frictional engagement therewith by curved plate springs, said gear being adapted to release, under the action of common spring means disposed between intermediate followers which, in turn, engage the adjacent ends of said friction elements.

Other objects and advantages of the invention relating to the particular arrangement and construction of the various parts will become apparent as the description proceeds.

Referring to the drawing illustrating my invention, the scope whereof is defined by the appended claims:—

Figure 1 is a plan of draft rigging and associated cushioning mechanism embodying my invention.

Figure 2 is a partial side elevation and partial vertical section of the cushioning mechanism shown in Figure 1.

Figure 3 is a fragmentary plan of the mechanism illustrated in Figure 2.

Referring to the drawing in detail, like parts being designated by like reference characters, there is shown a pair of draft or center sills 1, to the inner surfaces of which are connected cheek plates 2 of the type adapted for tandem spring draft gears (see, for example, the T. H. Symington Patent, No. 1,378,633 of May 17, 1921).

In the present instance, instead of employing tandem spring draft gears with cheek plates, I use a friction draft gear 3 comprising a housing 4 open at both ends and provided with walls 5, the inner surfaces of which provide inclined friction surfaces 6. Friction elements or wedges 7 are received in each end of the housing 4 and have correspondingly inclined friction surfaces 8 engaging the friction surfaces 6 on the housing. The surfaces 6 and 8 preferably involve laterally offset portions providing shoulders 9 therebetween which serve for limiting outward movement of the wedges 7 with respect to the housing after said wedges have been assembled therewith.

In the present embodiment, I employ a single group of curved plate springs 10 for actuating each pair of friction elements or wedges 7, this being possible because the travel provided for the wedges in the preferred embodiment disclosed is only approximately half the normal wedge travel for friction draft gears of the type disclosed. For the same reason, I am able to employ a single release spring unit 11 comprising an outer helical spring 12 and an inner helical spring 13, the ends of which engage intermediate followers 14 which, in turn, act on the inner or adjacent ends 15 of the wedges or friction elements 7.

The gear 3 may be mounted between the front follower 16 and a rear follower 16', which followers normally respectively engage the front draft lug portions 17 of the cheek plates 2 and the rear draft lug portions 18 of said cheek plates. The housing or casing 4 of the gear 3 is preferably notched or decreased in width at its intermediate portion to clear the intermediate draft lugs 19 of the cheek plates 2, leaving lug portions 20 and 21 forwardly and rearwardly of said intermediate cheek plate portions 19, normally disposed in straddling relation therewith, and spaced the requisite distance therefrom to act in stopping the housing when the gear 3 has been fully compressed. The lug portions 20 and 21 desirably project beyond the widened end portions of the housing beyond the inner surfaces of the front and rear intermediate or limiting stops 17' and 18', and have such a dimension, longitudinally of the housing, that they normally lie midway between the intermediate lugs 19 and the stops 17' and 18', with normal spacing corresponding with the spacing between the followers 16 and 16' and the corresponding ends of the housing. The wider end portions of the housing provide friction surfaces of increased width, as compared with the notched portion, for engagement with correspondingly wide friction elements 7.

In the present embodiment, there is shown a vertical yoke 22 embracing the gear 3 and followers 16 and 16', and connected to a drawbar or coupler stem 23 by means of a horizontal draft key 24, the ends of which pass through slots in and are supported by the sills 1.

From the foregoing disclosure, taken in connection with the accompanying drawing, it will be apparent that I have devised a double-end non-selective travel draft gear for use with existing tandem spring cheek plates, the friction elements at each end of which are urged to released position by a single helical spring unit disposed therebetween. This construction, as well as the employment of a single group of leaf springs at each end between the corresponding friction elements or wedges is possible by virtue of dividing the compressive movement of the gear between the two ends of the housing instead of concentrating such movement at a single end.

When the coupler 23 is subjected to the action of draft forces, the yoke 22 pulls the rear follower 16' forwardly, forcing the rear wedges 7 into the housing 4 and simultaneously moving the housing forwardly over the front wedges 7 which are stopped by the front followers 16. The parts are preferably designed so that upon full compression of the gear on draft the front of the housing 4 engages the front follower 16 simultaneously with the engagement between the lugs 21 on the housing and the intermediate lugs 19 on the cheek plates 2 and the engagement between the lugs 20 and the front intermediate stops 17'.

When the coupler 23 is subjected to buffing forces, it urges the front follower 16 rearwardly, pushing the front wedges 7 into the housing 4 and simultaneously moving the housing rearwardly over the rear wedges 7 against the rear follower 16'. The parts are preferably designed so that the lugs 20 on the housing engage the lugs 19 on the cheek plates simultaneously with the engagement between the rear end of the housing and the rear follower 17 and the engagement between the lugs 21 and the rear intermediate stops 18'.

Although a preferred embodiment of my invention has been disclosed, it will be understood that modifications may be made within the spirit and scope of the appended claims and that the terms employed are used for descriptive and not limiting purposes.

I claim:—

1. In railway draft rigging, in combination with draft sills, cheek plates attached to said sills and providing a pocket defined by front and rear draft lugs, intermediate draft lugs in said pocket, cushioning mechanism mounted between said sills and comprising a unitary housing open at both ends, said housing being notched at the sides, thereby forming shoulders on opposite sides of said intermediate draft lugs, normally spaced therefrom, and adapted to engage therewith on the limit of movement in either buff or draft, the end portions of the housing being extended laterally beyond the notched portions to provide friction surfaces of increased width, friction elements in each extended end portion, actuating springs located in the notched portion of said housing, and followers normally engaging said friction elements at opposite ends of said cushioning mechanism and said front and rear draft lugs, yoke-acting means embracing said cushioning mechanism and followers, and a drawbar connected to said yoke-acting means.

2. In railway draft rigging, in combination with draft sills, cheek plates attached to said sills and providing a pocket defined by front and rear draft lugs, intermediate draft lugs in said pocket, and front and rear intermediate stops disposed respectively, between the front draft lugs and intermediate draft lugs, and between said intermediate draft lugs and rear draft lugs, cushioning mechanism mounted between said sills and comprising a unitary housing open at both ends, said housing being notched at the sides, thereby forming shoulders on opposite sides of said intermediate draft lugs, normally spaced therefrom, and adapted to engage therewith on the limit of movement in either buff or draft, the end portions of the housing being extended laterally beyond the notched portion to provide friction surfaces of increased width, parts of said housing being extended laterally beyond the widened end portions, between said intermediate draft lugs and front and rear intermediate stops, and normally spaced from said lugs and stops, friction elements in each end portion, actuating springs therefor located in the notched portion of said housing, and followers normally engaging said friction elements at opposite ends of said cushioning mechanism and said front and rear draft lugs, yoke-acting means embracing said cushioning mechanism and followers, and a drawbar connected to said yoke-acting means.

3. Cushioning mechanism comprising a unitary housing notched at its sides, thereby forming shoulders adapted to lie on opposite sides of intermediate draft lugs on associated cheek plates in spaced relation with respect thereto, the end portions of the housing being extended laterally beyond the notched portion to provide friction surfaces of increased width, friction elements in each extended end portion, and actuating springs located in the notched portion of said housing.

4. Cushioning mechanism comprising a unitary housing notched at the sides, thereby forming shoulders facing one another, and adapted to alternately engage associated draft lugs disposed therebetween, the end portions of the housing being extended laterally beyond the notched portions to provide friction surfaces of increased width, parts of said housing being extended laterally beyond the widened end portions to provide lugs defining the notched portion and adapted to cooperate with stop means on the other sides from said lugs, friction elements of corresponding width in the widened end portions, and actuating springs for said elements located in the notched portion of said housing.

FREDERICK G. SUCKOW.